United States Patent [19]

Humphreys

[11] 4,227,860
[45] Oct. 14, 1980

[54] AIRCRAFT PROPELLER PITCH CONTROL

[76] Inventor: James R. Humphreys, P.O. Box 133 Victoria Station, Montreal, Canada, P.Q. H3Z-2V4

[21] Appl. No.: 898,816

[22] Filed: Apr. 24, 1978

[51] Int. Cl.³ ............................................. B64C 11/44
[52] U.S. Cl. ........................................ 416/155; 416/5
[58] Field of Search ...................... 416/155, 5, 34, 61, 416/124

[56] References Cited

U.S. PATENT DOCUMENTS

| | | | |
|---|---|---|---|
| 1,181,458 | 5/1916 | Iskols | 416/155 X |
| 1,374,787 | 4/1921 | Walker | 416/155 X |
| 1,425,922 | 8/1922 | Wesnigk | 416/124 X |
| 1,747,230 | 2/1930 | Duprey | 416/155 |
| 2,612,228 | 9/1952 | Forsyth | 416/155 |
| 2,869,535 | 1/1959 | Horrell | 416/155 |
| 3,070,173 | 12/1962 | Toulmin | 416/34 |
| 3,573,520 | 4/1971 | Dorshimer | 416/61 X |
| 3,589,832 | 6/1971 | Harris et al. | 416/34 |
| 3,689,175 | 9/1972 | Hartzell et al. | 416/34 |
| 3,701,498 | 10/1972 | Ferrara | 416/5 X |

FOREIGN PATENT DOCUMENTS

| | | | |
|---|---|---|---|
| 712882 | 11/1941 | Fed. Rep. of Germany | 416/155 |
| 802737 | 9/1936 | France | 416/61 |
| 848267 | 10/1939 | France | 416/61 |
| 1446960 | 6/1966 | France | 416/5 |

*Primary Examiner*—Everette A. Powell, Jr.
*Attorney, Agent, or Firm*—Eddie E. Scott

[57] ABSTRACT

The pitch of a rotating propeller blade is adjusted to selectively increase the pitch of the blade or to selectively decrease the pitch of the blade. The blade is connected to a rotating hub by bearings that allow the blade to change pitch. A two-direction D.C. motor mounted on the rotating hub is selectively energized to increase or decrease the pitch of the blade. A pair of sensors are mounted on the rotating hub at different distances from the hub's axis of rotation. The first sensor is adapted to generate a signal for energizing the motor in a first direction and increase the pitch of the blade. The second sensor is adapted to generate a signal for energizing the motor in a second direction and decrease the pitch of the blade. An energy source spaced from the rotating blade selectively directs a first beam of energy onto said first sensor thereby causing said first sensor to generate a signal and energize the motor and selectively directs a second beam of energy onto said second sensor thereby causing said second sensor to generate a signal and energize the motor.

5 Claims, 2 Drawing Figures

4,227,860

AIRCRAFT PROPELLER PITCH CONTROL

CROSS-REFERENCE TO RELATED APPLICATIONS

This is a substitute application that discloses and claims subject matter in abandoned, noc-copending U.S. application Ser. No. 511,213 filed Oct. 24, 1974

BACKGROUND OF THE INVENTION

The present invention relates to apparatus for controlling at least one variable characteristic of a rotating element.

A simple, inexpensive, and reliable system for controlling variable characteristics of a rotating element is clearly needed. For example, it is desirable to change the pitch of an aircraft propeller to obtain high, low, flat, reverse, or feathered pitch. It is also desirable to adjust rotating elements in the oil industry (drill bit control), in the turbine engine industry (blade pitch control), and the ship and boating industry (propeller pitch control). The prior art control systems have used electrical slip rings, mechanical, and hydraulic equipment that has the disadvantage of being complicated, heavy, and/or expensive.

An aircraft propeller should have a different degree of pitch for different operating conditions. On take off a low degree of pitch is required to gain speed quickly and to climb to altitude. The propeller should then be adjusted to a high degree of pitch to obtain maximum speed. The prior art systems have not provided a reliable and inexpensive propeller pitch control system and many airplanes have had to use a fixed pitch propeller. The pitch of a fixed pitch propeller is generally chosen in the medium pitch range. This results in the aircraft operating at less than optimum performance substantially all of the time.

DESCRIPTION OF PRIOR ART

Control of variable characteristics of a rotating element has been accomplished through electrical slip rings, mechanical methods and hydraulic methods. The various prior art systems have the disadvantage of being complicated, heavy, bulky, and expensive.

SUMMARY OF THE INVENTION

The present invention provides apparatus for adjusting a rotating element in a controlled manner. In one embodiment of the invention the pitch of a rotating propeller blade is adjusted to selectively increase the pitch of the blade or to selectively decrease the pitch of the blade. A power means rotates with the rotating blade. The power means is adapted to change the pitch of the blade when the power means is energized. Actuation of the power means is provided by sensor means that rotate with the rotating blade. An energy source selectively directs a beam of energy onto said sensor means to actuate the power means. The above and other features and advantages of the present invention will become apparent from a consideration of the following detailed description of the invention when taken in conjunction with the drawings.

DETAILED DESCRIPTION OF THE INVENTION

Figure 1:
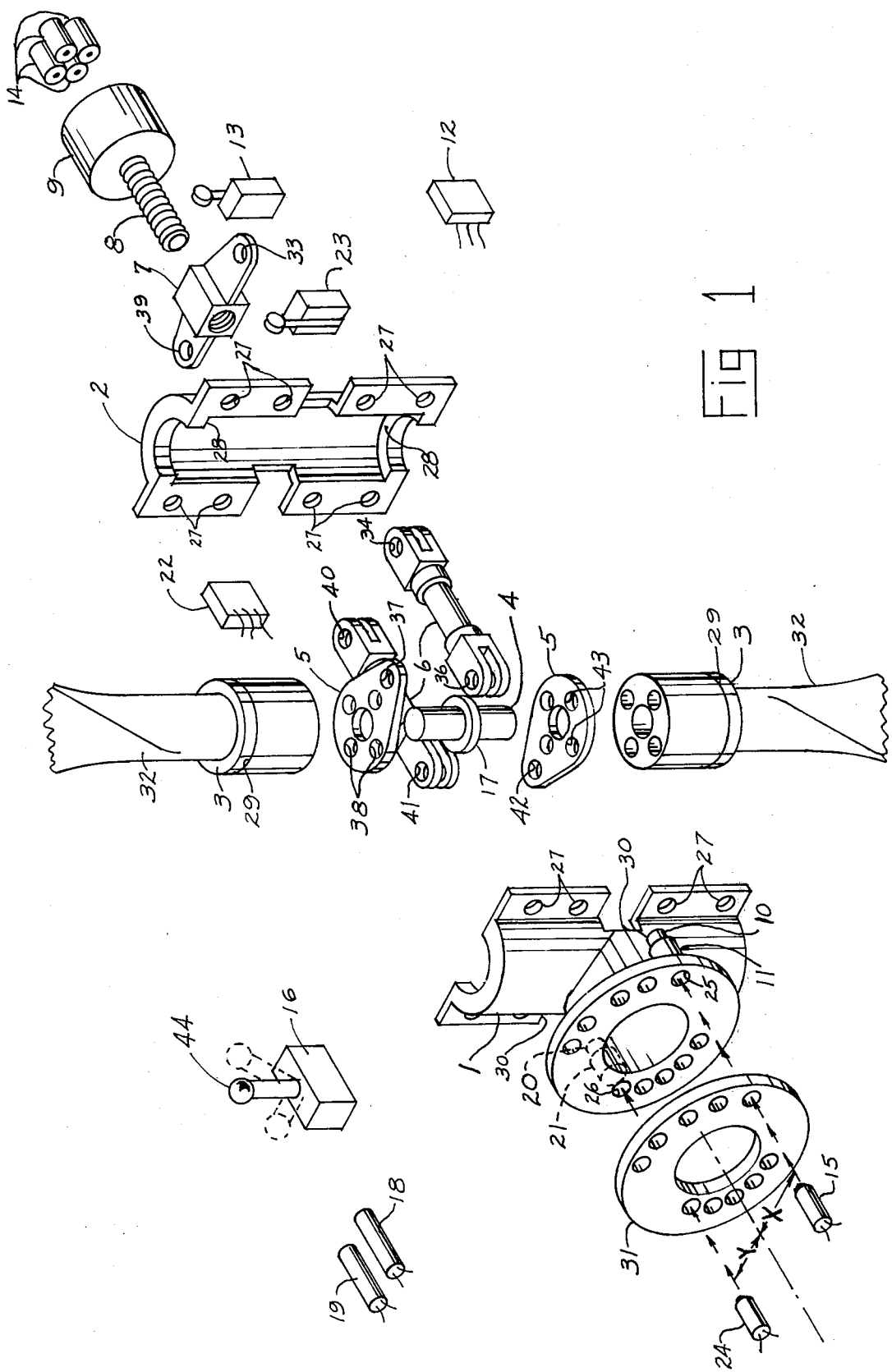
FIG. 1 shows one embodiment of the invention.

Referring now to the drawings and to FIG. 1 in particular, one embodiment of the present invention is shown. In order to obtain optimum performance of an aircraft the aircraft's propeller should have a different degree of pitch for different operating conditions. A low degree of pitch is required on take off. The propeller should then be adjusted to a higher degree of pitch as the speed increases. The present invention provides a simple, reliable, and inexpensive system for controlling the pitch of the aircraft's propeller blades.

The propeller is split into two sections on blades 32. The two blades are rotatably connected to the aircraft (not shown) by a hub unit consisting of a forward hub 1 and an aft hub 2. The forward hub 1 and aft hub 2 are bolted together by bolts (not shown) that extend through holes 27. A centering pin/bearing/shim 17 is positioned between the sections 32 of the propeller. The sections 32 of the propeller are retained by projections 28 on the forward hub 1 and aft hub 2. The projections 28 overlap enlarged sections 29 on the sections 32 of the propeller 32. Plastic bearing elements 3 are positioned between the projections 28 and the enlarged portions 29 to allow the sections of the blades 32 to turn and change pitch. Arms 5 are connected to the enlarged portions 29 of the blades 32 by bolts (not shown) that extend through holes 38 and 43 respectively. It will be appreciated that the position of the arms 5 determines the pitch of blades 32.

The position of the arms 5 is adjusted by rods 6 that extend between arms 5 and slide 7. One of the rods 6 is connected to slide 7 by a bolt (not shown) that fits through hole 34 in rod 6 and hole 33 in slide 7. The other end of the rod 6 is connected to one of the arms 5 by a bolt (not shown) that fits through a hole 36 in rod 6 and a hole 37 in arm 5. The other rod 6 is connected to slide 7 by a bolt (not shown) that fits through hole 40 in rod 6 and hole 39 in slide 7. The other end of the rod 6 is connected to one of the arms 5 by a bolt (not shown) that fits through a hole 41 in rod 6 and a hole 42 in arm 5. The position of slide 7 determines the position of arms 5 and therefore determines the pitch of blades 32.

The motor 9 determines the position of slide 7. A threaded shaft 8 is rotated by motor 9. The slide 7 includes a section with threads that mate with the threads on the threaded shaft 8. The motor 9 is a two direction D. C. motor. When the motor 9 is energized to run in one direction the slide will be moved in one direction by the threaded shaft to increase the pitch of the propeller blades 32. When the motor 9 is energized in the opposite direction the slide will be moved in the opposite direction by the threaded shaft to decrease the pitch of the propeller blades 32. Limit switches 13 and 23 determine the range of travel of slide 7 and the range of pitch. Batteries 14 provide current to the motor 9.

A first light sensor 10 is connected to the forward hub 1 at a first distance X from the axis of rotation of the propeller blade 32. A second light sensor 20 is connected to the forward hub 1 at a second distance Y from the axis of rotation of the propeller blade 32. A first light source 15 is spaced from the forward hub 1. The first light source 15 is located at the first distance X from the axis of rotation of the propeller blade 32. A second light source 24 is spaced from the forward hub 1. The second light source 24 is located at the second distance Y from the axis of rotation of the propeller blade 32. The light sources 15 and 24 are positioned to selectively direct a beam of light onto the rotating light sensors 10 and 20. A light sensor shield 11 is positioned between the light source 15 and the light sensor 10 to prevent extraneous light from actuating light sensor 10. The sensor shield 11 is a light deadening black tube. A light sensor shield 21 is positioned between light source 24 and the light sensor 20 to prevent extraneous light from actuating light 20. The sensor shield 21 is a light deadening black tube. The light sources 15 and 24 are mounted in line with holes in flange 31. The flange 31 is attached to the engine or propeller drive shaft (not shown). A switch 16 selectively actuates the light sources 15 and 24 to selectively energize either light source 15 or 24. The panel lights 18 and 19 indicate that the energizer circuit is activated and identifies the circuit. For example, when the blade 32 is directed toward a lower pitch, the low pitch light 18 will be lit and when blade 32 is directed toward a higher pitch, the high pitch light 19 will be lit. The position of handle 44 is self centering to an off position, but when held either forward or aft, energizes the light sources, sensors and motor, and controls the pitch of blades 32.

Figure 2:
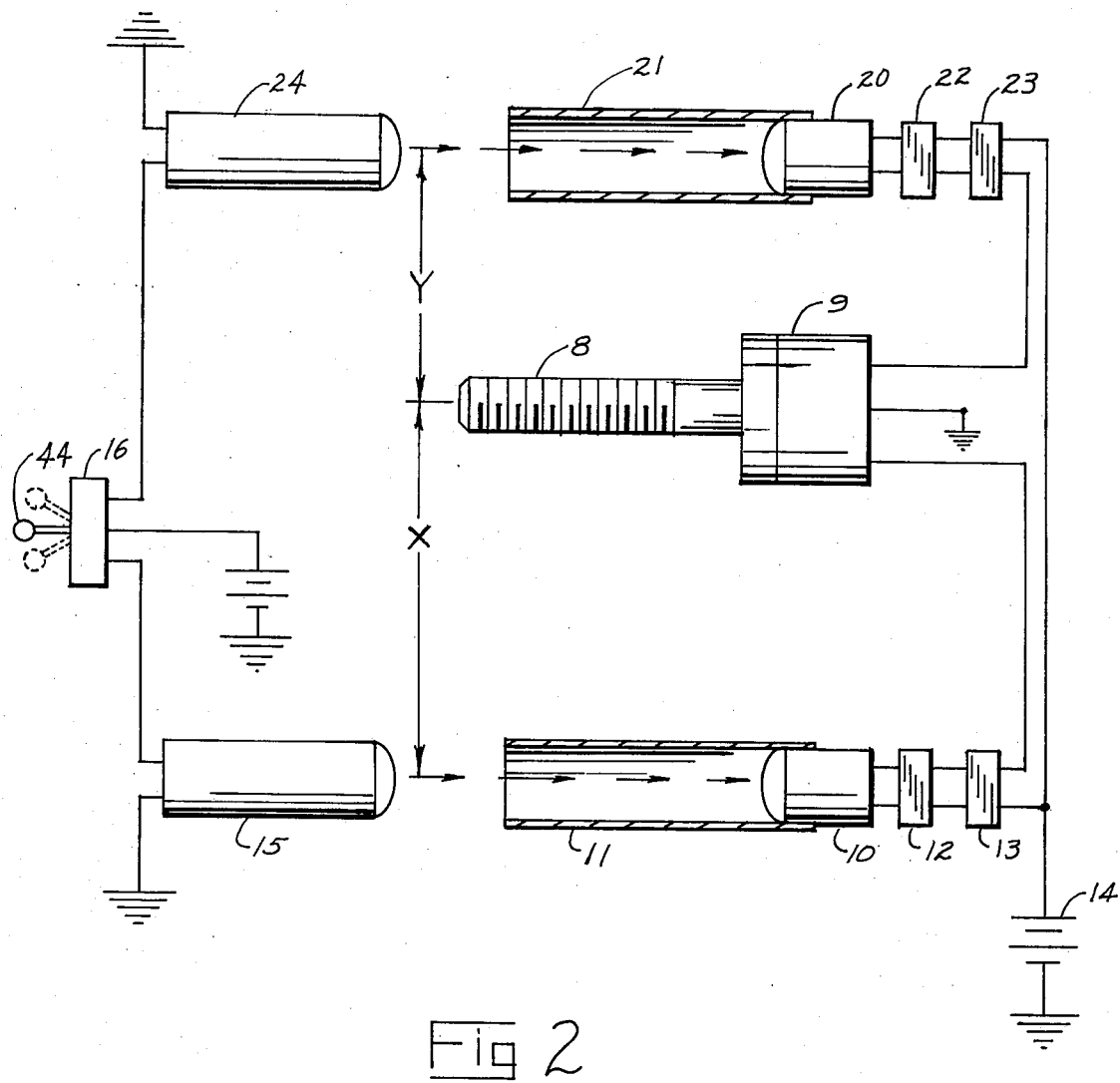
FIG. 2 illustrates the electrical circuit of the embodiment of the invention shown in FIG. 1.

Referring now to FIG. 2 the operation of the apparatus shown in FIG. 1 will be explained. When the switch 44 is moved downward the light source 15 is energized to direct a beam of light onto the rotating light sensor 10. The light source 15 and sensor 10 are positioned X distance from the axis of rotation of the propeller. The light deadening tube 11 is positioned between light source 15 and light sensor 10 to prevent sunlight and extraneous light from actuating light sensor 10. When the light beam strikes light sensor 10 a circuit is completed connecting batteries 14 and motor 9 thereby energizing motor 9 and rotating threaded shaft 8 in a first direction. The threaded shaft 8 rotates and moves the slide thereby changing the pitch of the propeller blade. The limit switch 13 prevents the motor 9 from moving the slide beyond a predetermined position thereby establishing the desired pitch.

When the switch 44 is moved upward the light source 24 is energized to direct a beam of light onto the rotating light sensor 20. The light source 24 and light sensor 20 are positioned Y distance from the axis of rotation of the propeller blade. The X and Y distances are different thereby insuring that light from light source 15 will not strike light sensor 20 and that light from light source 24 will not strike light sensor 10. The light deadening tube 21 is positioned between light source 24 and light sensor 20 to prevent sunlight and extraneous light from actuating light sensor 20. When the light beam strikes light sensor 20 a circuit is completed connecting batteries 14 and motor 9 thereby energizing motor and gear box 9 and rotating threaded shaft 8 in a second direction. The threaded shaft 8 rotates and moves the slide thereby changing the pitch of the propeller blade. The limit switch 23 prevents the motor 9 from moving the slide beyond a predetermined position thereby establishing the desired pitch. A component 22 may be included in the circuit to protect the light sensor 20.

A preferred embodiment of apparatus constructed in accordance with the present invention having been described, a a modification embodiment will now be described. A free turning forward spinner on the aircraft propeller is driven in the opposite direction to the rotating propeller by the wind forces from the aircraft's forward motion impinging on small blades or deflection slots. This counter-rotation of the engine driven propeller and the wind driven forward spinner can be utilized to generate either hydraulic or electrical forces to change the pitch of the propeller blade during flight. High, low, reverse, or feathered propeller pitch is controlled from the cockpit by selectively directing a laser beam or other beam of energy from the cockpit to a sensor on the spinning propeller blade.

The embodiments of an invention in which an exclusive property or privilege is claimed are defined as follows:

1. An apparatus for changing the pitch of a rotating aircraft propeller blade to selectively decrease the pitch of the blade to provide power for take-off or increase the pitch of the blade to increase speed, comprising:
   an aircraft propeller blade positioned to rotate about an axis of rotation,
   an aircraft propeller hub,
   bearings connecting said propeller blade to said propeller hub that allow said blade to change pitch,
   slide means connected to said aircraft propeller blade by rods for turning said blade on said bearings thereby changing the pitch of said blade, said slide means moveable axially along said axis of rotation,
   motor means having a threaded drive shaft connected to said slide means for moving said slide means axially,
   energy source means connected to said motor means for energizing said motor means,
   light sensor means connected to said energy source means for generating a signal to energize said motor means, and
   light source means spaced from said rotating aircraft propeller blade for selectively directing a beam of light onto said light sensor means to actuate said light sensor means thereby causing said light sensor means to generate a signal and energize said motor means to change the pitch of said blade, said light sensor means consisting of a first light sensor and a second light sensor with said first light sensor and said second light sensor spaced at different distances from said axis of rotation and said energy source means consisting of a first means for generating a beam of light and directing the beam of light onto said first light sensor and a second means for generating a beam of light and directing the beam of light onto said second light sensor.

2. The apparatus of claim 1 including a first light shield tube positioned between said first light sensor and said first means for generating a beam of light and a second light shield tube positioned between said second light sensor and said second means for generating a beam of light.

3. The apparatus of claim 2 wherein said first and second light sensors are selectively actuated with said first light sensor acting to decrease the pitch of the blade and said second light sensor acting to increase the pitch of the blade.

4. An apparatus for providing pitch adjustment to a rotating propeller blade, comprising:
   a propeller blade positioned to rotate about an axis of rotation;
   a propeller hub,
   bearings connecting said propeller blade to said propeller hub that allow said blade to change pitch,
   power means including an energy source connected to said propeller blade for providing pitch adjustment to said propeller blade when actuated, light sensor means connected to said power means for actuating said power means in response to a beam of light, said light sensor means consisting of a pair of spaced light sensors, and light source means spaced from said rotating blade for selectively directing a beam of light onto said light sensor means thereby actuating said power means and providing pitch adjustment, wherein said light source means is a pair of light sources with one of said light sensors and one of said light sources being spaced a first distance from said axis of rotation and with the other of said light sensors and the other of said light sources being spaced a second and different distance from said axis or rotation.

5. The apparatus of claim 4 including a pair of light shield tubes connected to said pair of light sensors.

* * * * *